United States Patent
Laskawiec et al.

(10) Patent No.: US 11,036,698 B2
(45) Date of Patent: Jun. 15, 2021

(54) NON-RELATIONAL DATABASE COPROCESSOR FOR READING RAW DATA FILES COPIED FROM RELATIONAL DATABASES

(71) Applicant: INTERNATIONAL BUSINESS MACHINES CORPORATION, Armonk, NY (US)

(72) Inventors: Andrzej Laskawiec, Cracow (PL); Michal Bodziony, Tęgoborze (PL); Lukasz S. Studzienny, Cracow (PL); Marcin Luczynski, Cracow (PL); Marcin Filip, Cracow (PL); Monika Piatek, Cracow (PL); Tomasz Zatorski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/211,902

(22) Filed: Dec. 6, 2018

(65) Prior Publication Data
US 2020/0183897 A1    Jun. 11, 2020

(51) Int. Cl.
*G06F 16/21* (2019.01)
*G06F 16/25* (2019.01)
*G06F 16/22* (2019.01)
*G06F 16/28* (2019.01)

(52) U.S. Cl.
CPC ........ *G06F 16/214* (2019.01); *G06F 16/2282* (2019.01); *G06F 16/258* (2019.01); *G06F 16/284* (2019.01)

(58) Field of Classification Search
CPC ..................................................... G06F 16/284
See application file for complete search history.

(56) References Cited

U.S. PATENT DOCUMENTS

| 7,167,893 | B1 * | 1/2007 | Malone | H04M 15/00 709/201 |
| 8,037,108 | B1 * | 10/2011 | Chang | G06F 16/214 707/803 |
| 9,424,261 | B2 * | 8/2016 | Li | G06F 16/128 |
| 2005/0182772 | A1 * | 8/2005 | Mital | G06F 16/258 |

(Continued)

FOREIGN PATENT DOCUMENTS

| CN | 103631907 | 3/2014 |
| CN | 104123392 | 10/2014 |

(Continued)

*Primary Examiner* — Eliyah S. Harper
(74) *Attorney, Agent, or Firm* — William Hartwell; Andrew D. Wright; Roberts Calderon Safran & Cole, P.C.

(57) ABSTRACT

Methods and systems for moving a dataset from a relational database to a non-relational database are disclosed. A method includes: copying, by a computing device, source datafiles from a relational database to each of a plurality of region servers associated with a non-relational database; generating, by the computing device, at least one table in the non-relational database from the copied source datafiles; and accessing, by the computing device, the at least one table in the non-relational database by reading raw data stored in a relational database format from the copied source datafiles on one of the plurality of region servers associated with the non-relational database.

18 Claims, 5 Drawing Sheets

(56) References Cited

U.S. PATENT DOCUMENTS

| | | | |
|---|---|---|---|
| 2008/0077635 A1* | 3/2008 | Sporny | G06F 16/1834 |
| 2010/0235409 A1* | 9/2010 | Roy | G06F 16/1827 |
| | | | 707/812 |
| 2012/0233228 A1* | 9/2012 | Barton | G06F 16/178 |
| | | | 707/827 |
| 2016/0034504 A1* | 2/2016 | Borah | G06F 16/22 |
| | | | 707/812 |
| 2018/0167461 A1* | 6/2018 | Shen | G06F 9/505 |
| 2020/0117748 A1* | 4/2020 | Gupte | G06F 16/27 |

FOREIGN PATENT DOCUMENTS

| | | |
|---|---|---|
| CN | 104391957 | 3/2015 |
| CN | 104504008 | 4/2015 |

* cited by examiner

NON-RELATIONAL DATABASE COPROCESSOR FOR READING RAW DATA FILES COPIED FROM RELATIONAL DATABASES

BACKGROUND

The present invention generally relates to computing devices and, more particularly, to methods and systems for moving a dataset from a relational database to a non-relational database.

Data is stored in various types of databases, including relational databases and non-relational databases. In a relational database, data is stored and retrieved based on a relational model that organizes data into one or more tables of columns and rows. In a non-relational database such as HBase™ (a trademark of The Apache Software Foundation), data is stored and retrieved using a model other than the tabular model used in a relational database.

SUMMARY

In a first aspect of the invention, there is a method that includes: copying, by a computing device, source datafiles from a relational database to each of a plurality of region servers associated with a non-relational database; generating, by the computing device, at least one table in the non-relational database from the copied source datafiles; and accessing, by the computing device, the at least one table in the non-relational database by reading raw data stored in a relational database format from the copied source datafiles on one of the plurality of region servers associated with the non-relational database.

In another aspect of the invention, there is a computer program product that includes a computer readable storage medium having program instructions embodied therewith. The program instructions are executable by a computing device to cause the computing device to: receive a request to move data from a relational database to a non-relational database; stop the relational database; copy source datafiles from the relational database to each of a plurality of region servers associated with the non-relational database; generate at least one table in the non-relational database from the copied source datafiles; and access the at least one table in the non-relational database by reading raw data stored in a relational database format from the copied source datafiles on one of the plurality of region servers.

In another aspect of the invention, there is a system that includes: a hardware processor, a computer readable memory, and a computer readable storage medium associated with a computing device; program instructions to copy source datafiles from a relational database to each of a plurality of region servers associated with a non-relational database; program instructions to generate at least one table in the non-relational database from the copied source datafiles; and program instructions to access the at least one table in the non-relational database by reading raw data stored in a relational database format from the copied source datafiles on one of the plurality of region servers associated with the non-relational database, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for moving a dataset from a relational database to a non-relational database. As described herein, aspects of the invention include a method and system that copy a complete set of source datafiles from a source relational database to region servers of a non-relational database and enable the non-relational database to read the original raw data from the copied source datafiles using a coprocessor. The coprocessor reads original metadata from the source datafiles and transforms it to non-relational database metadata along with splitting the data into regions.

In order to process data stored in a relational database using certain tools, including Hadoop® (a registered trademark of The Apache Software Foundation) tools such as Spark™ (a trademark of The Apache Software Foundation), Flink® (a registered trademark of The Apache Software Foundation), and M/R, it is first necessary to move the data from the relational database to a non-relational database such as HBase™. Moving a large dataset from a relational database to a non-relational database such as HBase™ may be time consuming due to the large amount of data that must be unloaded from the source relational database, converted into a form that is consumable by the destination non-relational database, and loaded into the destination non-relational database.

Aspects of the invention address this problem of efficiently moving a large dataset from a relational database to a non-relational database by providing a method and system that copy a complete set of source datafiles from a source relational database to region servers of a non-relational database and enable the destination non-relational database to read the original raw data (stored in a relational database format) from the copied source datafiles using a coprocessor, avoiding the time-consuming process of converting the raw data into a form that is consumable by the destination non-relational database and loading the converted data into the non-relational database. Accordingly, embodiments improve the functioning of a computer by providing methods and systems for efficiently moving datasets from relational databases to non-relational databases such as HBase™. In particular, embodiments improve databases and database software by providing a non-relational database coprocessor that reads original raw data (stored in a relational database format) from the datafiles copied from a source relational database. Additionally, implementations of the invention use techniques that are, by definition, rooted in computer technology (e.g., relational databases and non-relational databases).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
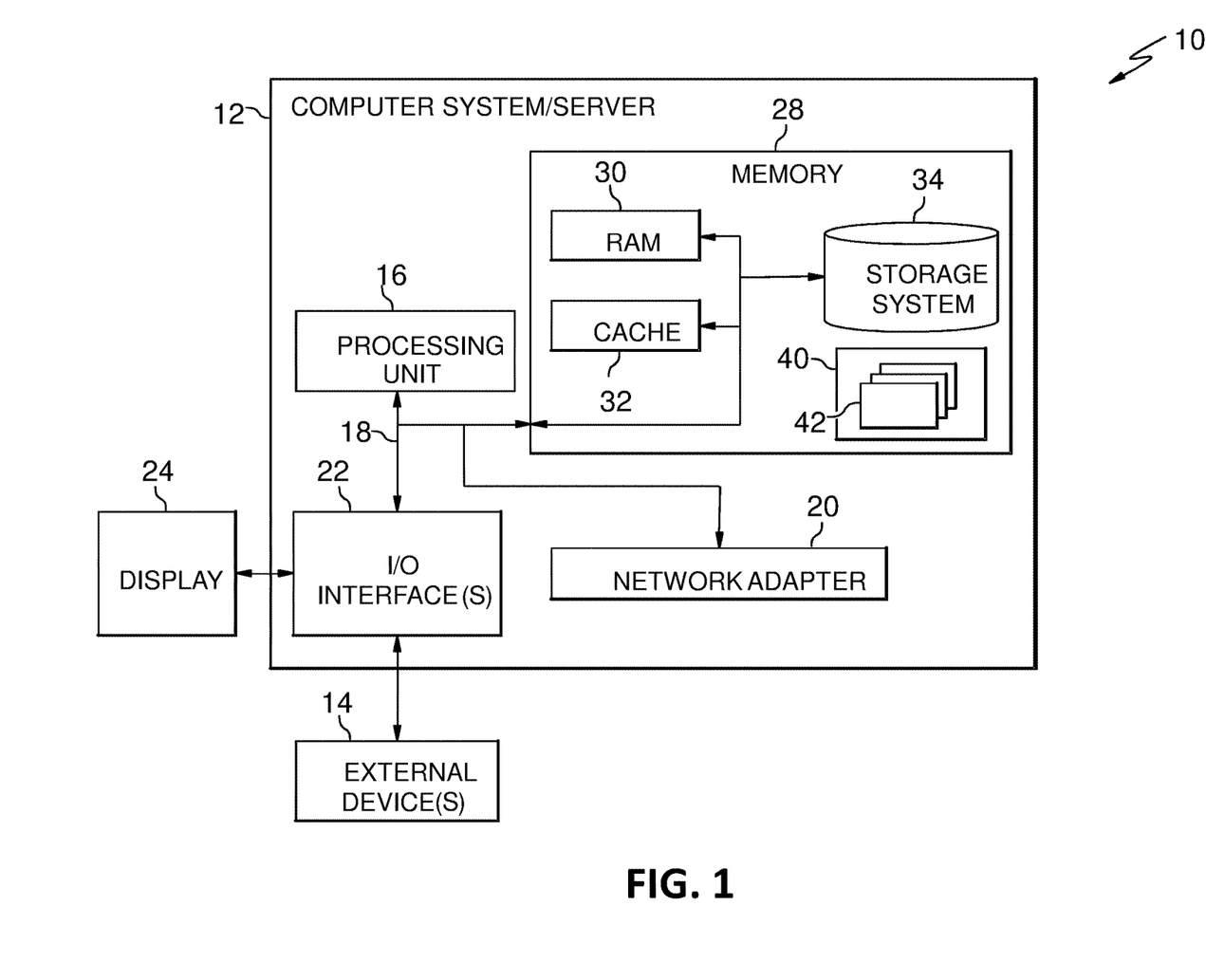
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
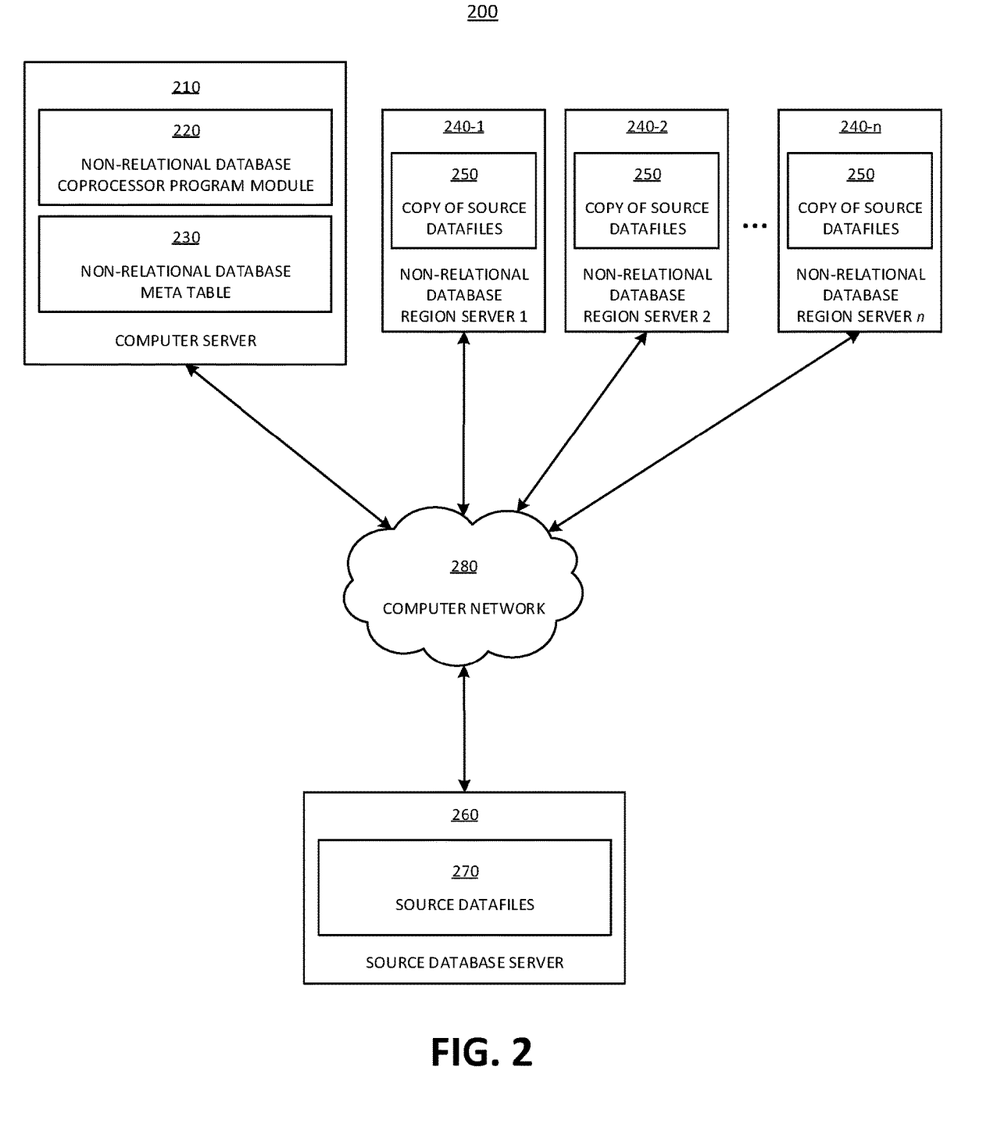
FIG. 2 depicts an illustrative environment in accordance with aspects of the invention.

FIG. 2 depicts an illustrative environment 200 in accordance with aspects of the invention. As shown, the environment 200 comprises a computer server 210, a plurality of non-relational database region servers 240-1, 240-2, . . . , 240-n, and a source database server 260 which are in communication via a computer network 280. In embodiments, the computer network 280 is any suitable network including any combination of a LAN, WAN, or the Internet. In embodiments, the computer server 210, the non-relational database region servers 240-1, 240-2, . . . , 240-n, and the source database server 260 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a non-relational database coprocessor program module 220, which includes hardware and/or software and is one or more of the program modules 42 shown in FIG. 1. According to an embodiment, the non-relational database coprocessor program module 220 includes program instructions for copying a complete set of source datafiles from a source relational database (e.g., the source datafiles 270 on the source database server 260) to region servers (e.g., the non-relational database region servers 240-1, 240-2, . . . , 240-n) associated with a non-relational database such as HBase™ and enabling the non-relational database to read the original raw data (stored in a relational database format) from the copied source datafiles (e.g., the copy of source datafiles 270). In embodiments, the program instructions included in the non-relational database coprocessor program module 220 of the computer server 210 are executed by one or more hardware processors. In embodiments, the computer server 210 also includes a non-relational database meta table 230, which stores information about non-relational database region server assignments, as described below. In embodiments, the non-relational database meta table 230 is an HMaster meta table of an HBase™ database.

Still referring to FIG. 2, in embodiments, each of the non-relational database region servers 240-1, 240-2, . . . , 240-n is a computer device comprising one or more elements of the computer system/server 12 (as shown in FIG. 1). In particular, each of the non-relational database region servers 240-1, 240-2, . . . , 240-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the non-relational database region servers 240-1, 240-2, . . . , 240-n stores a copy of the source datafiles 250. As described herein, the copy of the source datafiles 250 is made by the non-relational database coprocessor program module 220, which copies a complete set of the source datafiles from a source relational database (e.g., the source datafiles 270 on the source database server 260) to each of the non-relational database region servers 240-1, 240-2, . . . , 240-n.

Still referring to FIG. 2, in embodiments, the source database server 260 is a computer device comprising one or more elements of the computer system/server 12 (as shown in FIG. 1). In particular, the source database server 260 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In embodiments, the source database server 260 hosts a source relational database comprising the source datafiles 270.

Figure 3:
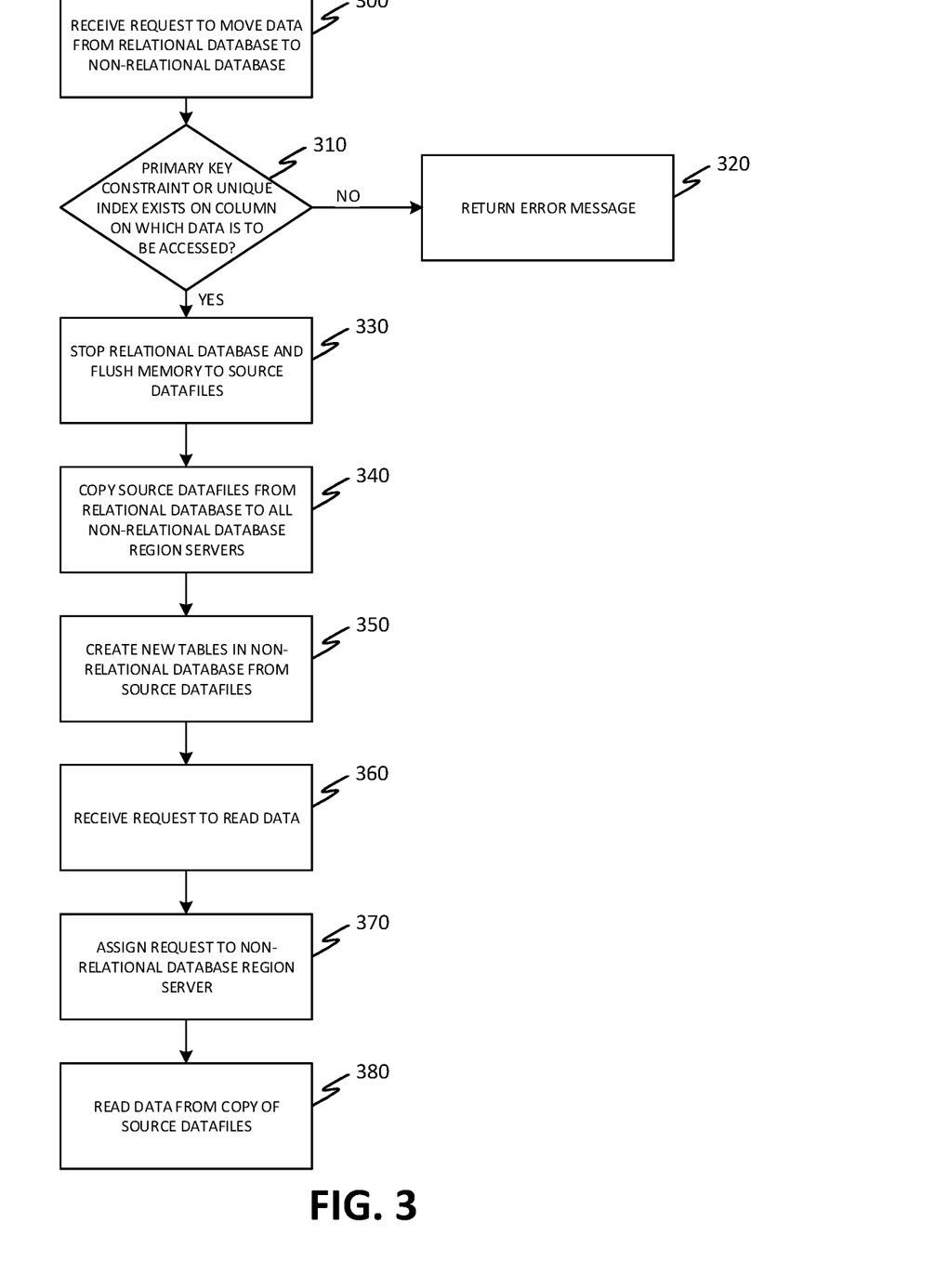
FIG. 3 depicts a flowchart of an exemplary method performed in accordance with aspects of the invention.

FIG. 3 depicts a flowchart of an exemplary method performed by the non-relational database coprocessor program module 220 of the computer server 210 in accordance with aspects of the invention. The steps of the method are performed in the environment of FIG. 2 and are described with reference to the elements shown in FIG. 2.

At step 300, the computer server 210 receives a request to move data from a relational database to a non-relational database. In embodiments, the non-relational database coprocessor program module 220 receives a request from a user or another program module to move a dataset comprising the source datafiles 270 on the source database server 260. The source datafiles 270 are datafiles of a relational database. In embodiments, the non-relational database is an HBase™ database.

At step 310, the computer server 210 determines whether or not a primary key constraint or unique index exists on the column on which data is to be accessed. In embodiments, the non-relational database coprocessor program module 220 determines, for each table in the data being moved from the relational database to the non-relational database, whether or not a primary key constraint or unique index exists on the column on which data is to be accessed in the non-relational database. If it is determined at step 310 that a primary key constraint or unique index exists, then the flow proceeds to step 330. On the other hand, if it is determined at step 310 that a primary key constraint or unique index does not exist, then the flow proceeds to step 320.

At step 320, the computer server 210 returns an error message. In embodiments, the non-relational database coprocessor program module 220 returns an error message to the user or the program module that made the request received at step 300, and the flow ends.

At step 330, the computer server 210 stops the relational database and flushes the memory to the datafiles. In embodiments, the non-relational database coprocessor program module 220 causes the source database server 260 to stop the relational database and flush the memory to the source datafiles 270.

At step 340, the computer server 210 copies the source datafiles from the relational database to all of the non-relational database region servers. In embodiments, the non-relational database coprocessor program module 220 causes the source datafiles 270 on the source database server 260 to be copied to each of the non-relational database region servers 240-1, 240-2, . . . , 240-n. The files included in the source datafiles 270 vary depending on the vendor associated with the source relational database of the source datafiles 270. For example, if the source relational database is a Db2 database, then the source datafiles 270 may include all of the db2 directory structure. On the other hand, for another type of source relational database, the source datafiles 270 may include all of the files with a particular filename extension (e.g., *.dbf).

In the source relational database, the tables included in the source datafiles 270 are heap organized. On the other hand, the data in the non-relational database is split among the plurality of non-relational database region servers 240-1, 240-2, . . . , 240-n and sorted by the row ID. Because of these differences in data organization between the source relational database and the non-relational database, the non-relational database coprocessor program module 220 does not divide the source datafiles 270 among the plurality of non-relational database region servers 240-1, 240-2, . . . , 240-n based on a subset of data handled by each of the non-relational database region servers 240-1, 240-2, . . . , 240-n. Instead, the copying performed at step 340 by the non-relational database coprocessor program module 220 includes copying the entire set of source datafiles 270 to each of the non-relational database region servers 240-1, 240-2, . . . , 240-n. Accordingly, the highest level of data replication is provided, as the copying of the source datafiles 270 performed at step 340 results in a complete copy of the source datafiles 250 being stored on each of the non-relational database region servers 240-1, 240-2, . . . , 240-n.

At step 350, the computer server 210 creates new tables in the non-relational database from the source datafiles. In embodiments, the non-relational database coprocessor program module 220 reads the original metadata from the source datafiles 270 or the copy of the source datafiles 250 and transforms it to non-relational database metadata by causing non-relational database data definition language (DDL) commands to be executed that create tables in the non-relational database for each of the tables included in the copy of the source datafiles 250 stored on each of the non-relational database region servers 240-1, 240-2, . . . , 240-n. Each of the tables created at step 350 is treated as having a single column family. In embodiments, the non-relational database creates columns dynamically on data insert. Accordingly, in embodiments, the non-relational database coprocessor program module 220 does not create any columns in the newly created non-relational database tables.

Additionally, at step 350, the non-relational database coprocessor program module 220 creates, in the non-relational database meta table 230 on the computer server 210, a new entry for each of the tables included in the copy of the source datafiles 250 stored on each of the non-relational database region servers 240-1, 240-2, . . . , 240-n, including parameters specifying how read requests should be assigned to the non-relational database region servers 240-1, 240-2, . . . , 240-n. The parameters stored in the non-relational database meta table 230 may define a static region assignment, in which the entire range of data included in the copy of the source datafiles 250 is split between the non-relational database region servers 240-1, 240-2, . . . , 240-n. For example, using database statistics from the source datafiles 270 (e.g., number of records, max and min values of primary key column, etc.), split ranges may be defined in the non-relational database meta table 230 (e.g., table 1, rows 0 to 10 are assigned to non-relational database region server 1 240-1; table 1, rows 11 to 20 are assigned to non-relational database region server 2 240-2; etc.).

Alternatively, the non-relational database coprocessor program module 220 may assign a read request based on a current load of each of the non-relational database region servers 240-1, 240-2, . . . , 240-n at the time the read request is received by the non-relational database coprocessor program module 220. In particular, the non-relational database coprocessor program module 220 may skip the static region assignment and instead monitor the load of each of the non-relational database region servers 240-1, 240-2, . . . , 240-n, assigning each request to the non-relational database region server of the plurality of non-relational database region servers 240-1, 240-2, . . . , 240-n having the lowest utilization, thereby splitting the load evenly between all of the non-relational database region servers 240-1, 240-2, . . . , 240-n. In this case, the parameters stored in the non-relational database meta table 230 indicate that, for a particular table, all rows are assigned to all of the non-relational database region servers 240-1, 240-2, . . . , 240-n (e.g., table 1, rows null to null are assigned to all region servers).

At step 360, the computer server 210 receives a request to read data from the non-relational database. In embodiments, the non-relational database coprocessor program module 220 receives the request to read data from the non-relational database from a user or from another program module.

At step 370, the computer server 210 assigns the request to a region server. In embodiments, the non-relational database coprocessor program module 220 assigns the request received at step 360 to one of the non-relational database region servers 240-1, 240-2, . . . , 240-n selected based on parameters stored in the non-relational database meta table 230 on the computer server 210. If the parameters stored in the non-relational database meta table 230 indicate that the request is to be assigned to a particular non-relational database region server of the non-relational database region servers 240-1, 240-2, . . . , 240-n based on the row associated with the request, then the non-relational database coprocessor program module 220 assigns the request to the non-relational database region server indicated in the non-relational database meta table 230. On the other hand, if the parameters stored in the non-relational database meta table 230 indicate that the request is to be assigned to a region server based on a current load of each of the non-relational database region servers 240-1, 240-2, . . . , 240-n, then the non-relational database coprocessor program module 220 assigns the request to the non-relational database region server of the plurality of non-relational database region servers 240-1, 240-2, . . . , 240-n having the lowest utilization.

At step 380, the computer server 210 reads the data from the copy of the source datafiles. In embodiments, the non-relational database coprocessor program module 220 reads the data requested at step 360 from the copy of the source datafiles 250 stored on the non-relational database region server assigned from the non-relational database region servers 240-1, 240-2, . . . , 240-n at step 370. The non-relational database coprocessor program module 220 uses the primary key index as well as information the structure and organization of the source datafiles 250 (e.g., stored knowledge about various relational databases and their datafiles) to access the original raw data stored in a relational database format in the copy of the source datafiles 250. The data that is read from the copy of the source datafiles 250 is then returned to the user or the program module that made the request.

In embodiments, the non-relational database coprocessor program module 220 reads data from the copy of the source datafiles 250 but does not write data to the copy of the source datafiles 250, due to a lack of support for region splits and compactions, TTL for qualifiers' values, and Bloom filters in the copy of the source datafiles 250.

Figure 4:
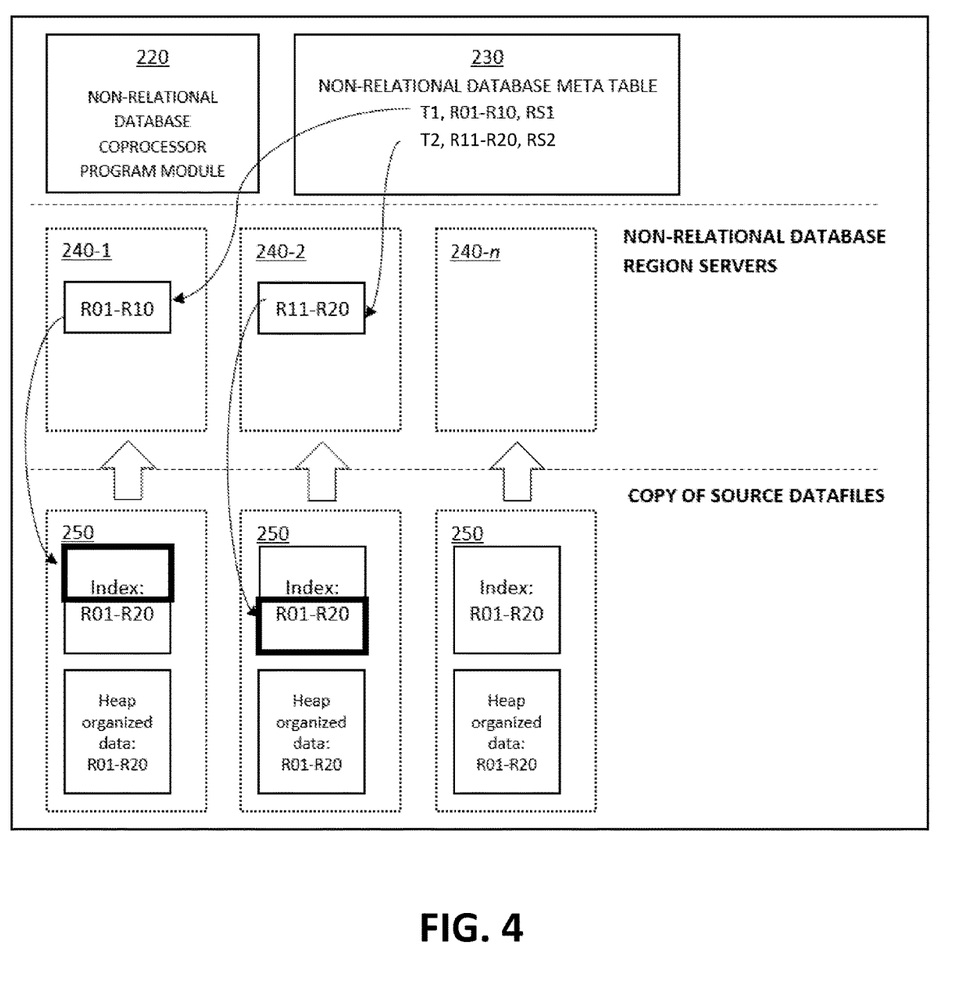
FIGS. 4 and 5 depict illustrative examples of the non-relational database coprocessor program module reading data in accordance with aspects of the invention.

FIG. 4 depicts an illustrative example of the non-relational database coprocessor program module 220 reading data from the copy of the source datafiles 250 on one of the non-relational database region servers 240-1, 240-2, . . . , 240-n selected based upon a static region assignment in the non-relational database meta table 230. In FIG. 4, a request to read data in rows 1 through 10 of table T1 is assigned to the non-relational database region server 1 240-1 by the non-relational database coprocessor program module 240, and a request to read data in rows 11 through 20 of table T2 is assigned to the non-relational database region server 2 240-2 by the non-relational database coprocessor program module 240. The complete copy of the source datafiles 250 is stored on each of the non-relational database region servers 240-1, 240-2, . . . , 240-n, even though the non-relational database region server 1 240-1 only handles read requests for rows 01 through 10 of table T1 and the non-relational database region server 2 240-2 only handles read requests for rows 11 through 20 of table T2.

Figure 5:
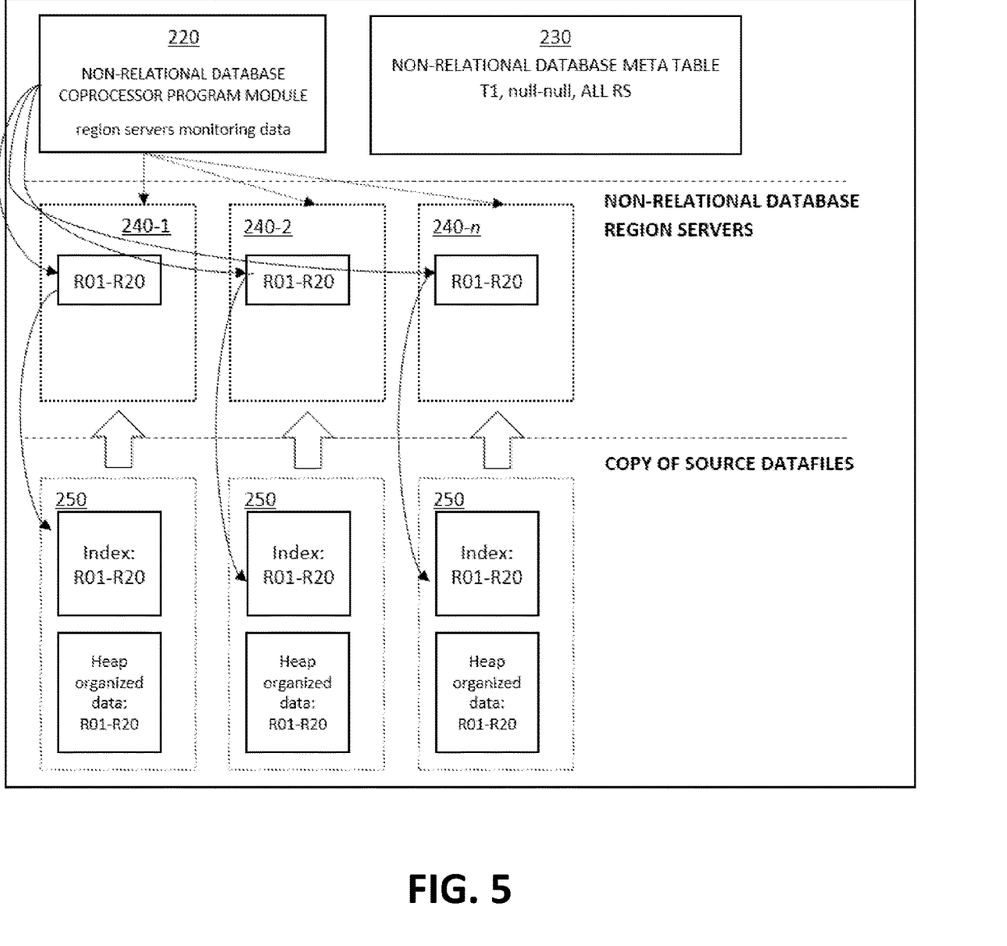

FIG. 5 depicts an illustrative example of the non-relational database coprocessor program module 220 reading data from the copy of the source datafiles 250 on one of the non-relational database region servers 240-1, 240-2, . . . , 240-n selected based upon a current load of each of the non-relational database region servers 240-1, 240-2, . . . , 240-n. In FIG. 5, the non-relational database meta table 230 indicates that for T1, rows null to null, all region servers handle read requests. Accordingly, the non-relational database coprocessor program module 240 assigns one of the non-relational database region servers 240-1, 240-2, . . . , 240-*n* to handle the read request based upon the non-relational database region server 240-1, 240-2, . . . , 240-*n* having the lowest current load.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    copying, by a computing device, source datafiles from a relational database to each of a plurality of region servers associated with a non-relational database, wherein the copying of the source datafiles results in a complete copy of the source datafiles being stored on each of the plurality of region servers;
    generating, by the computing device, at least one table in the non-relational database from the copied source datafiles; and
    accessing, by the computing device, the at least one table in the non-relational database by reading raw data stored in a relational database format from the copied source datafiles on one of the plurality of region servers associated with the non-relational database.

2. The method according to claim 1, wherein the copying the source datafiles and the generating the at least one table in the non-relational database are performed in response to the computing device determining that a primary key constraint exists on a column on which data is to be accessed.

3. The method according to claim 1, further comprising stopping, by the computing device, the relational database prior to the copying the source datafiles from the relational database.

4. The method according to claim 1, further comprising flushing, by the computing device, memory to the source datafiles prior to the copying the source datafiles from the relational database.

5. The method according to claim 1, wherein the accessing the at least one table in the non-relational database comprises:
    receiving, by the computing device, a request to access the at least one table in the non-relational database; and
    assigning, by the computing device, the request to access the at least one table in the non-relational database to the one of the plurality of region servers based on information about a static region assignment stored in a meta table of the non-relational database.

6. The method according to claim 1, wherein the accessing the at least one table in the non-relational database comprises:
    receiving, by the computing device, a request to access the at least one table in the non-relational database; and
    assigning, by the computing device, the request to access the at least one table in the non-relational database to the one of the plurality of region servers based on a current load of each of the plurality of region servers.

7. The method according to claim 6, further comprising assigning the request to a region server having a lowest load among the plurality of region servers.

8. A computer program product comprising a computer readable storage medium having program instructions embodied therewith, the program instructions executable by a computing device to cause the computing device to:
    receive a request to move data from a relational database to a non-relational database;
    stop the relational database;
    copy source datafiles from the relational database to each of a plurality of region servers associated with the non-relational database;
    generate at least one table in the non-relational database from the copied source datafiles; and
    access the at least one table in the non-relational database by reading raw data stored in a relational database format from the copied source datafiles on one of the plurality of region servers.

9. The computer program product according to claim 8, wherein the non-relational database is HBase.

10. The computer program product according to claim 8, the program instructions further being executable by the computing device to cause the computing device to flush memory to the source datafiles prior to the copying the source datafiles from the relational database.

11. The computer program product according to claim 8, wherein the accessing the at least one table in the non-relational database comprises:
    receiving a request to access the at least one table in the non-relational database; and
    assigning the request to access the at least one table in the non-relational database to the one of the plurality of region servers based on information about a static region assignment stored in a meta table of the non-relational database.

12. The computer program product according to claim 8, wherein the accessing the at least one table in the non-relational database comprises:
    receiving a request to access the at least one table in the non-relational database; and assigning the request to access the at least one table in the non-relational database to the one of the plurality of region servers based on a current load of each of the plurality of region servers.

13. The computer program product according to claim 12, wherein the request is assigned to a region server having a lowest load among the plurality of region servers.

14. A system comprising:
a hardware processor, a computer readable memory, and a computer readable storage medium associated with a computing device;
program instructions to copy source datafiles from a relational database to each of a plurality of region servers associated with a non-relational database such that a complete copy of the source datafiles are stored on each of the plurality of region servers;
program instructions to generate at least one table in the non-relational database from the copied source datafiles; and
program instructions to access the at least one table in the non-relational database by reading raw data stored in a relational database format from the copied source datafiles on one of the plurality of region servers associated with the non-relational database, wherein the accessing the at least one table in the non-relational database comprises:
receiving a request to access the at least one table in the non-relational database; and
assigning the request to access the at least one table in the non-relational database to the one of the plurality of region servers based on a current load of each of the plurality of region servers, wherein the request is assigned to a region server having a lowest load among the plurality of region servers,
wherein the program instructions are stored on the computer readable storage medium for execution by the hardware processor via the computer readable memory.

15. The system according to claim 14, wherein the copying the source datafiles and the generating the at least one table in the non-relational database is performed in response to determining that a primary key constraint exists on a column on which data is to be accessed.

16. The system according to claim 14, further comprising program instructions to stop the relational database prior to the copying the source datafiles from the relational database.

17. The system according to claim 14, further comprising program instructions to flush memory to the source datafiles prior to the copying the source datafiles from the relational database.

18. The system according to claim 14, wherein the assigning the request to access the at least one table in the non-relational database to the one of the plurality of region servers is further based on information about a static region assignment stored in a meta table of the non-relational database.

* * * * *